(12) United States Patent
Barcome

(10) Patent No.: US 6,247,880 B1
(45) Date of Patent: Jun. 19, 2001

(54) MILLING MACHINE CHIP DEFLECTOR

(76) Inventor: Gregory Barcome, 4441 Payne Rd., Attica, MI (US) 48412

( * ) Notice: Subject to any disclaimer, the term of this patent is extended or adjusted under 35 U.S.C. 154(b) by 0 days.

(21) Appl. No.: 09/636,544

(22) Filed: Aug. 10, 2000

(51) Int. Cl.[7] ............................. B23C 9/00; B23B 47/00
(52) U.S. Cl. ............................. 409/134; 29/DIG. 94; 74/608; 408/710
(58) Field of Search ................... 409/134, 137, 409/136; 29/57, DIG. 34, DIG. 50, DIG. 56, DIG. 94; 408/241 G, 710, 241 R; 144/251.1, 253.2; 74/609

(56) References Cited

U.S. PATENT DOCUMENTS

| | | |
|---|---|---|
| 1,527,998 | 3/1925 | Serpico . |
| 1,563,887 | 12/1925 | Wiespetat . |
| 3,703,124 | 11/1972 | Smith et al. . |
| 3,837,383 | 9/1974 | Ko . |
| 4,043,701 | 8/1977 | Jaeger . |
| 4,126,081 | 11/1978 | Zdeb . |
| 4,132,497 | 1/1979 | Weller et al. . |
| 4,162,647 | 7/1979 | Aslen . |
| 4,290,717 | 9/1981 | Aslen . |
| 4,424,741 | * 1/1984 | Moldestad ................ 83/DIG. 1 |
| 4,484,845 | * 11/1984 | Pennella, Jr. et al. ........ 409/134 |
| 4,543,021 | 9/1985 | Adler . |
| 4,552,494 | 11/1985 | Wix . |
| 4,884,927 | 12/1989 | Menker . |
| 5,056,969 | * 10/1991 | Nerland et al. ............. 409/134 |
| 5,103,541 | 4/1992 | Ferletic . |
| 5,218,887 | 6/1993 | Ziobro . |
| 5,479,837 | 1/1996 | Kyle . |
| 5,778,952 | * 7/1998 | Aigner ................. 144/253.2 |

* cited by examiner

Primary Examiner—William Briggs
(74) Attorney, Agent, or Firm—Robert M. Hunter

(57) ABSTRACT

An apparatus for guarding an operator from hazards produced at the point of operation of a machine tool. The apparatus comprises a mounting bracket for attaching the fixture to the dovetail of the ram of a milling machine (e.g., a Bridgeport vertical milling machine), the mounting bracket having a first end and a second end; a swing arm attached to one of the ends; and a guard attached to the swing arm. In some embodiments, a second swing arm attached to the other of the ends supports a second guard or a tube that carries oil to the work piece.

3 Claims, 4 Drawing Sheets

MILLING MACHINE CHIP DEFLECTOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention relates to a fixture for a milling machine. In particular, the invention relates to a chip guard and the milling machine equipped with the chip guard.

It is considered good practice to shield machine operators from workplace hazards. The Occupational Safety & Health Administration (OSHA) of the U.S. Department of Labor, in Standard No. 1910.22, requires that one or more methods of machine guarding be provided to protect operators from hazards associated with machine tool operation. For these reasons, a variety of guard designs have been developed. The background art is characterized by the inventions described in U.S. Pat. Nos. 1,527,998; 1,563,887; 3,703,124; 3,837,383; 4,043,701; 4,126,081; 4,132,497; 4,162,647; 4,290,717; 4,543,012; 4,543,021; 4,552,494; 4,884,927; 5,103,541; 5,218,887; and 5,479,837; the disclosures of which patents are incorporated herein as if fully set forth.

Serpico in U.S. Pat. No. 1,527,998 discloses a protective guard for a router. This invention is limited in that it must be attached to the router rod portion of the router. The invention is further limited in that the glass guard can only be pivoted about a horizontal axis.

Wiespetat in U.S. Pat. No. 1,563,887 discloses a drill press guard. This invention is limited in that the guard must be attached to the feed rack or quill of the drill press.

Smith et al. in U.S. Pat. No. 3,703,124 disclose a machine tool guard and/or safety guard. This invention is limited in that it is attached to a slot in the table of the machine tool and does not effectively protect the user when the tool is raised above the surface of the table.

Ko in U.S. Pat. No. 3,837,383 discloses a dust collector and safety guard. This invention is limited in that it is attached to the machine tool by means of a flange that must be fixed to the machine.

Jaeger in U.S. Pat. No. 4,043,701 discloses a safety shield assembly. This invention is limited in that it is attached to the machine tool by means of a bracket.

Zdeb in U.S. Pat. No. 4,126,081 discloses a safety shield for a machine tool. This invention is limited in that the safety shield must be attached to the quill of the milling machine. The invention is further limited in that the panels of the shield can only be pivoted about a horizontal axis.

Weller et al. in U.S. Pat. No. 4,132,497 disclose drilling machines and guards therefor. This invention is limited in that it must be attached to the quill of a vertical milling machine.

Aslen in U.S. Pat. No. 4,162,647 discloses a guard for a milling machine that comprises a combination of rods and blocks supporting guard panels relative to the milling tool. In one embodiment, the invention of Aslen comprises a plurality of mounting bars that are attached to the dovetail of a milling machine ram by means of clamping blocks secured in place with clamping bolts. Each mounting bar supports a pair of mounting blocks from which support rods extend into support blocks. A mounting rod extends downward from each support block to which an attachment block is secured. Each pair of support blocks a guard panel. This invention is limited in that multiple mounting bars, mounting blocks, support blocks and attachment blocks are required. The requirement for multiple mounting bars and blocks means that the device cannot be attached to the end of the dovetail when the ram is moved backward leaving only a short portion of the dovetail forward of the turret, which is normally the case. The invention is further limited in that planar guard panels are provided, which panels can only be pivoted about a horizontal axis.

Aslen in U.S. Pat. No. 4,290,717 discloses machinery safety guards. This invention is limited in that it must be attached to the barrel of a vertical milling machine.

Adler in U.S. Pat. No. 4,543,021 discloses a safety shield for a machine tool. This invention is limited in that it must be connected by a series of rods, links, knuckle joints, etc. to an existing hole in a Bridgeport type milling machine.

Wix in U.S. Pat. No. 4,552,494 discloses a collapsible safety shield for a vertical drill press. This invention is limited in that it must be attached to the drill housing.

Menker in U.S. Pat. No. 4,884,927 discloses a shield unit for a machine tool. This invention is limited in that it must be attached to the machine tool's spindle adjustment rod.

Ferletic in U.S. Pat. No. 5,103,541 discloses a milling machine stop bar for use with reversing tapping attachments. The stop-bar is clamped onto the ram of the milling machine. This invention is limited in that it does not provide a guard for protection of the machine operator.

Ziobro in U.S. Pat. No. 5,218,887 discloses a drill chuck and revolving spindle guard. This invention is limited in that the safety shield must be attached to the quill of milling machine. The invention is further limited in that the guard cannot be repositioned vertically.

Kyle in U.S. Pat. No. 5,479,837 discloses a guard for a channel bed press. This invention is limited in that it attaches to the rear channel on the channel bed of such a press.

The inventions in the related art exhibit one or more limitations. Many related art milling machine guards attach to the quill, quill housing, barrel, etc. of the machine, parts which are tilted from the vertical or moved relative to the workpiece during some machine operations. Under these conditions, the related art guards can interfere with the operations and the guards can be rendered less effective by their orientation or distance from the workpiece. The related art fixtures that attach to the dovetail of the milling machine ram are overly mechanically complex and, hence, expensive to manufacture and difficult to use, not designed to be attached to the end of the dovetail or fail to guard the operator. None of the related art fixtures can be moved out of the way when not required. Furthermore, none of the related art fixtures direct oil to the cutting face.

BRIEF SUMMARY OF THE INVENTION

The purpose of the invention is to deflect chips that are produced during a milling operation and generally to facilitate the milling operation and protect the machine operator from rotating parts, flying chips and sparks. One advantage of the invention is that it is mechanically simple (comprises relatively few parts) and simple to use. Another advantage is that one or more of the guarding means (arms and guards) can be rotated (swung) out of the way when not required. Another advantage of the invention is that the guard is attached to the milling machine at a point that does not move when the quill moves.

One object of the invention is to deflect chips produced during a milling operation. Another object of the invention is to shield a machine operator during a milling operation. A further object is to direct oil to a cutting face.

The invention is an apparatus for guarding an operator from hazards produced at the point of operation of a machine tool. The apparatus comprises means for attaching a fixture to the dovetail of the ram of a milling machine (e.g., a Bridgeport vertical milling machine), said means for attaching having a first end and a second end; a swing arm attached to one of said ends; and guarding means attached to said swing arm. In some embodiments, a second swing arm attached to the other of said ends supports a second guarding means or a tube that carries oil to the work piece.

In use, the invention is operated by sliding a mounting bracket onto the dovetail of a ram of a milling machine and by securing the mounting bracket on the dovetail by means of a vertical set screw that is threaded into the mounting bracket. Each of the arms of the device are then swung forward (and raised or lowered, if necessary) to position the guards between the machine operator and the point of operation. Each of the arms is then secured in place by means of a horizontal set screw on the mounting bracket. For the purposes of this disclosure, the term "vertical" means generally in a plane transverse to the longitudinal axis of the bracket with a general up and down orientation and the term "horizontal" means generally in a plane parallel to the longitudinal axis of the bracket with a general side to side or back to front orientation.

In broad terms, a preferred embodiment of the apparatus is a device for deflecting chips produced by operation of a milling machine, said milling machine having a ram with a dovetail, said device comprising: a bracket that is slidably mountable on said dovetail, said bracket having a first end and a second end; a first swing arm that is rotatably attachable to said bracket adjacent said first end; a second swing arm that is rotatably attachable to said bracket adjacent said second end; and a pair of deflectors, one of which is attachable (preferably slidably attachable) to said first swing arm and the other of which is attachable (preferably slidably attachable) to said second swing arm.

Another preferred embodiment of the invention is a point of operation guard for use on a milling machine having a ram on which the head of the milling machine is mounted, said ram being attached to the column of the milling machine by means of a dovetail slide, said dovetail slide having a mortise portion that is attached to said column and a tenon portion that is attached to said ram, said point of operation guard comprising: a body having a mortise therein that is slidably mountable on said tenon portion, said body having a first end and a second end; a first arm that is rotatably attached to said body adjacent said first end; and a first deflector attached to said first arm. In an alternative embodiment the above point of operation guard also comprises: a second arm that is rotatably attached to said body adjacent said second end; and a second deflector attached to said second arm.

In another alternative embodiment, the above point of operation guard also comprises: a solid thumb screw that is screwed into a first threaded hole in said body and that impinges on said tenon portion when said body is mounted on said tenon portion. In another alternative embodiment, the above point of operation guard also comprises: a first nylon- or brass-tipped thumb screw that is screwed into a second threaded hole in said body and that has a first nylon or brass tip that impinges on said first arm when said arm is inserted through a first unthreaded hole in said body; and a second nylon- or brass-tipped thumb screw that is screwed into a third threaded hole in said body and that has a second nylon or brass tip that impinges on said second arm when said arm is inserted through a second unthreaded hole in said body. In another alternative embodiment, the invention is the above point of operation guard wherein said first deflector and said second deflector each comprise a flexible plastic member having a longitudinal hole therein; and wherein said first arm and said second arm are fitted through each hole. In another alternative embodiment, the invention is the above point of operation guard wherein an end of each arm that protrudes through said unthreaded holes in said body is fitted with a cap made of a resilient material (e.g., rubber). In another alternative embodiment, the invention is the above point of operation guard wherein said body is comprised of two pieces, with each piece forming a part of the mortise and wherein said pieces are connected by a bolt that is used to adjust the effective width of said mortise.

In another preferred embodiment, the invention is a milling machine comprising the above apparatus for guarding an operator or point of operation guard. The milling machine further comprises a base, a column resting on said base, said column supporting a turret having a tenon portion of a dovetail slide, a table resting on a knee which rests on a pedestal that extends upward from said base, a ram having a mortise portion of the dovetail slide, and a head attached to said ram, said head having a quill and a spindle.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

Figure 1:
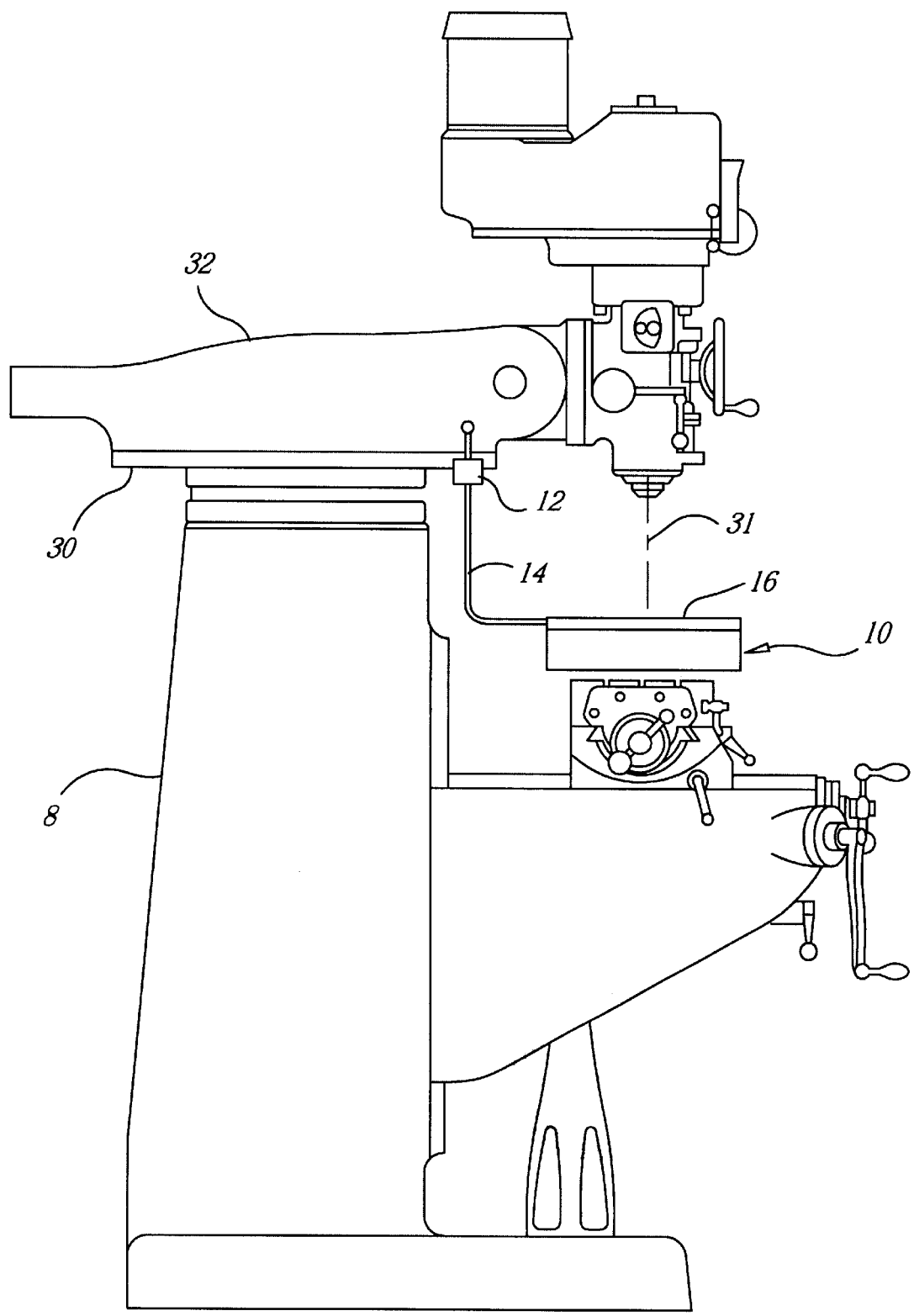
FIG. 1 is an elevation view of a milling machine with a preferred embodiment of the point of operation guard installed.

The following reference numerals are used to indicate the parts and environment of the invention on the drawings:

8 milling machine
10 chip deflector
12 mounting bracket
14 first pivot arm
15 first rubber cap
16 first plastic guard
18 second pivot arm 19 second rubber cap
20 second plastic guard
22 mortise
24 first part
26 second part
28 threaded rod
30 tenon
31 centerline
32 ram
34 vertical thumb screw
36 first vertical segment
38 first horizontal thumb screw
40 second vertical segment
42 second horizontal thumb screw
44 first horizontal portion
46 second horizontal portion
48 first curved portion
50 second curved portion
52 source of oil
54 first vertical unthreaded hole
56 first horizontal hole
58 first end
60 second vertical unthreaded hole
62 first horizontal hole
64 second end
66 vertical threaded hole
70 first unthreaded portion
72 first spring
74 second unthreaded portion
76 second spring
80 first horizontal threaded hole
82 second horizontal threaded hole
84 first tubular portion
86 first guard portion

DETAILED DESCRIPTION OF THE INVENTION

Referring to FIG. 1, milling machine 8 is shown equipped with chip deflector 10. Chip deflector 10 is mounted on tenon 30 portion of ram 32 by means of mounting bracket 12. First pivot arm 14 extends downward from mounting bracket 12 and then horizontally, supporting first plastic guard 16. Mounting bracket 12 is attached to tenon 30 portion at a location that positions plastic guard 16 between the center line 31 of the spindle of milling machine 8 (and, hence, the point of operation) and the machine operator (not shown).

Figure 2:
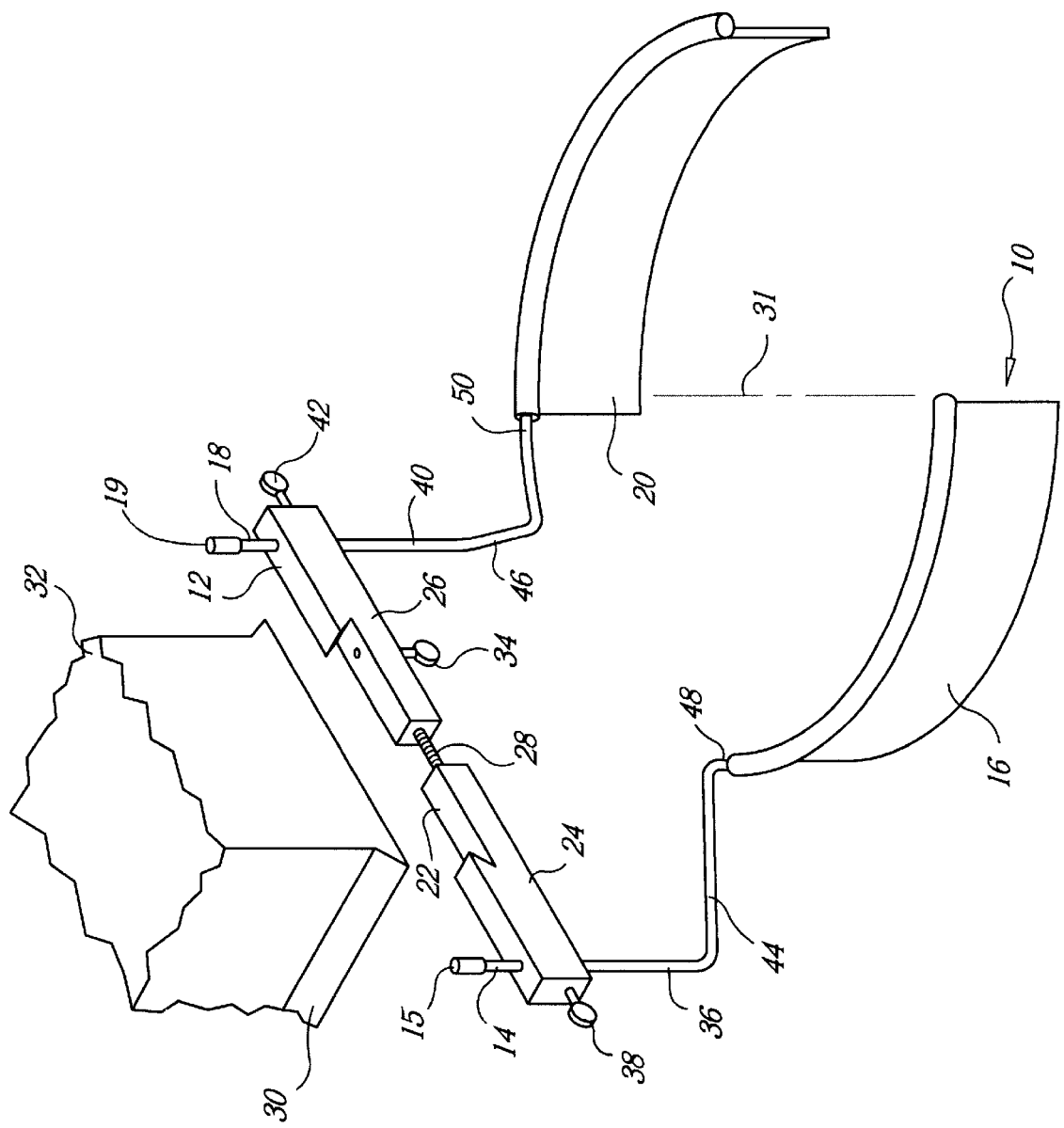
FIG. 2 is a perspective view of a first preferred embodiment of the device before it has been attached to a milling machine.

Referring to FIG. 2, a first preferred embodiment of chip deflector 10 is illustrated. Chip deflector 10 comprises mounting bracket 12, first pivot arm 14 which supports first plastic guard 16 and second pivot arm 18 which supports second plastic guard 20. Mounting bracket 12 is configured to provide mortise 22 portion of a dovetail joint. In the embodiment illustrated in FIG. 1, mounting bracket comprises two parts: first part 24 and second part 26. The width of mortise 22 is adjustable by means of threaded rod 28 which is screwed into threaded holes in first part 24 and second part 26 of mounting bracket 12. In an alternative embodiment, mounting bracket 12 is configured to provide a mortise having an adjustable width in accordance with the design illustrated in FIG. 3 of U.S. Pat. No. 5,103,541.

Mortise 22 portion of mounting bracket 12 slides onto tenon 30 portion of the dovetail slide that attaches ram 32 to the column of a vertical milling machine. When mounting bracket 12 is placed on tenon 30, it is moved to a position that places center line 31 of the milling machine spindle between plastic guards 16 and 20 and vertical thumb screw 34 is tightened to secure mounting bracket 12 to ram 32. Then, first vertical segment 36 of first pivot arm 14 is moved up or down to appropriately position first plastic guard 16, and fit horizontal thumb screw 38 is tightened to secure first plastic guard 16 in position. Finally, second vertical segment 40 of second pivot arm 18 is moved up or down to appropriately position second plastic guard 20, and second horizontal thumb screw 42 is tightened to secure second plastic guard 20 in position. In a preferred embodiment, the upper end of first pivot arm 14 is fitted with first rubber cap 15, and the upper end of second pivot arm 18 is fitted with second rubber cap 19. In a preferred embodiment, horizontal thumb screws 38 and 42 have nylon or brass tips. In a preferred embodiment, a product name, such as Batwing™ is written on the outside surface of first plastic guard 16.

Figure 3:
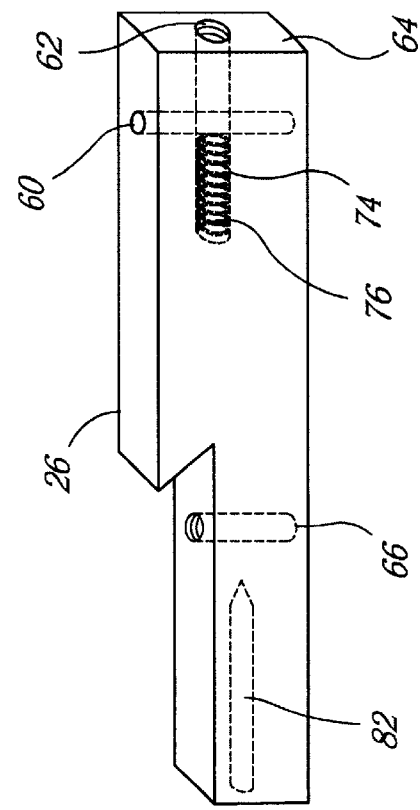
FIG. 3 is a perspective view of a second preferred embodiment of the device before it has been attached to a milling machine.
Figure 3:
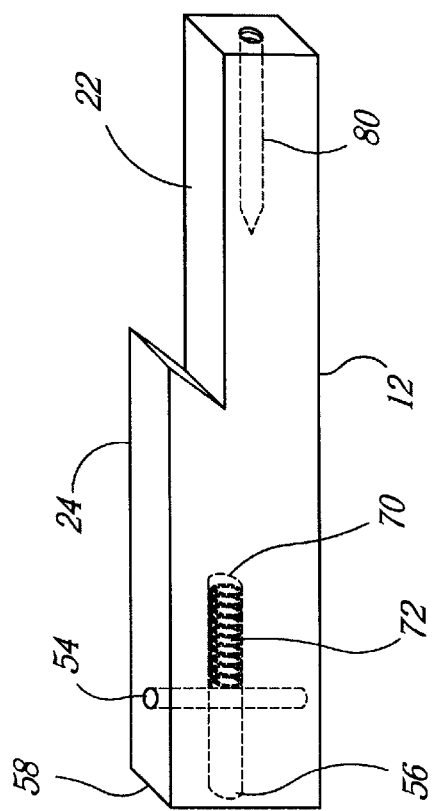

Referring to FIG. 3, a preferred embodiment of mounting bracket 12 is illustrated. Mounting bracket 12 is comprised of two parts that form mortise 22. Mounting bracket 12 has first vertical unthreaded hole 56 and first horizontal hole 56 adjacent first end 58, second vertical unthreaded hole 60 and second horizontal hole 62 adjacent second end 64 and first vertical threaded hole 66 below mortise 22. Mounting bracket 12 is held in position on tenon 30 portion by a first vertical thumbscrew that is screwed into first vertical threaded hole 66 and that impinges on tenon 30. First unthreaded portion 70 of first horizontal hole extends through first vertical unthreaded hole 54, and first spring 72 is compressed in first unthreaded portion 70 to the extent that it is biased against first arm 14 and first arm 14 resists rotation and up and down movement. Second unthreaded portion 74 of second horizontal hole 62 extends through second vertical unthreaded hole 60 and second spring 76 is compressed in second unthreaded portion 74 to the extent that it is biased against second arm 18, and second arms 18 resists rotation and up and down movement. In this embodiment, each of the parts of mounting bracket 12 has a horizontal threaded hole therein, the parts being held together by a threaded rod (not shown) that is screwed into first horizontal threaded hole 80 and second horizontal threaded hole 82. In another preferred embodiment, mounting bracket 12 is constructed in a single piece. In this embodiment, the width of mortise 22 is not adjustable.

In a further preferred embodiment, each of the pivot arms comprises a horizontal portion, e.g., first horizontal portion 44 and second horizontal portion 46, at least a portion of which is curved in a horizontal plane in the shape of a segment of a circle. In this embodiment, first plastic guard 16 is supported by first curved portion 48, and second plastic guard 20 is supported by second curved portion 50.

In another preferred embodiment, first plastic guard 16 and second plastic guard 20 each comprise a flexible plastic member having a longitudinal hole there through. In this embodiment, first pivot arm 14 and second pivot arm 18 are fitted through each hole. In an alternative embodiment, first pivot arm 14 and/or second pivot arm 18 support planar safety shields or guard panels similar to those disclosed in U.S. Pat. Nos. 4,043,701, 4,162,627, 4,543,021, 4,884,927 or 5,479,837.

Figure 4:
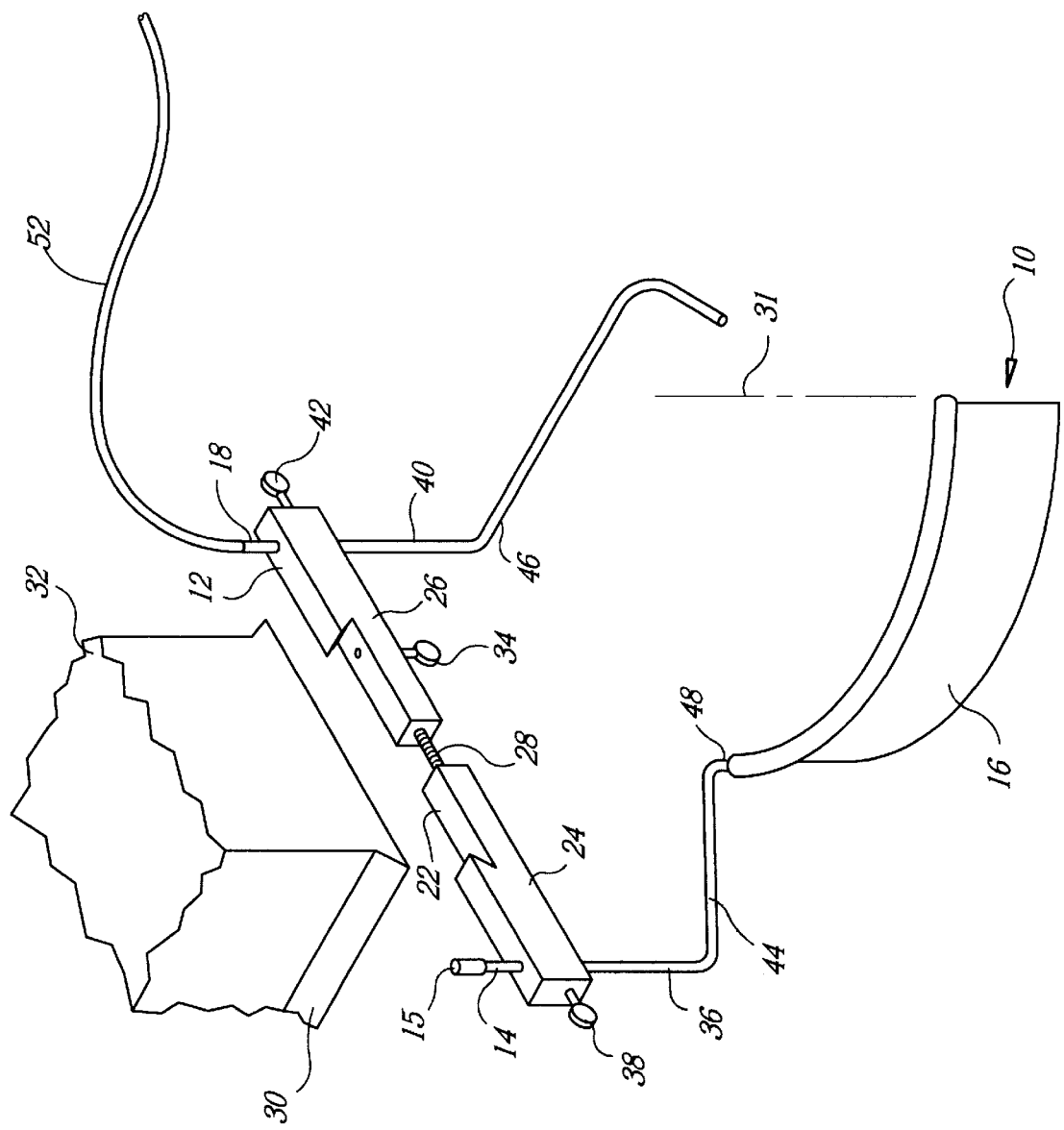
FIG. 4 is a perspective view of a preferred embodiment of the mounting bracket.

Referring to FIG. 4, an alternative embodiment of chip deflector 10 is illustrated. In this embodiment, only one of the pivot arms (e.g., first pivot arm 14) supports a plastic guard (e.g., first plastic guard 16). The second pivot arm (e.g., second pivot arm 18) is a length of tubing that carries oil from source of oil 52, e.g., a rubber or plastic tube carrying oil from a reservoir or pump (not shown), to the cutting surface. In this embodiment, plastic guard 16 has first tubular portion 84 and first guard portion 86 attached to first tubular portion 84, plastic guard 16 being attached to first pivot arm 14 by horizontal portion 44 of first pivot arm 14 extending through first tubular portion 84.

The best mode of the invention involves fabricating mounting bracket 12 from aluminum and pivot arms 14 and 18 from steel and first and second guards 16 and 20 from extruded thermoplastic. Conventional thumb screws, threaded rod or bolts and rubber tips are used.

Operation of the invention involves rotation of part 24 relative to part 26 until the width of mortice 22 is slightly wider than the width of tenon 30 portion. Then mounting bracket 12 is slipped on to tenon 30 and vertical thumb screw is tightened. Next, pivot arms 14 and 18 are rotated forward and toward the work area and secured in position with horizontal thumb screws 38 and 42. When chip guard 10 is not required, pivot arms 14 and 18 are pivoted about vertical axes back away from the work area.

Many variations of the invention will occur to those skilled in the art. Some variations include a one-piece mounting bracket. Other variations call for a multiple-piece mounting bracket. All such variations are intended to be within the scope and spirit of the invention.

I claim:

1. A point of operation guard for use on a milling machine having a ram on which the head of the milling machine is mounted, said ram being attached to the column of the milling machine by means of a dovetail slide, said dovetail slide having mortise portion that is attached to said column and a tenon portion that is attached to said ram, said point of operation guard comprising:

a mounting bracket having a mortise therein, which mortise is slidably mountable on said tenon portion, said mounting bracket having a first vertical unthreaded hole and a first horizontal hole adjacent first end, a second vertical unthreaded hole and a second horizontal hole adjacent said second end and a first vertical threaded hole below said mortise, said mounting bracket being held in position by a first vertical thumbscrew that is screwed into said first vertical threaded hole and that impinges on said tenon;

a first arm having a first horizontal portion and a first vertical portion that is rotatably attached to said mounting bracket adjacent said first end thereof said first vertical portion extending through said first vertical unthreaded hole and being held in a first operator-selected position by a first horizontal thumb screw that is screwed into a first threaded portion of said first horizontal hole and that impinges on said first vertical portion;

a first deflector having first tubular portion and a first guard portion attached to said first tubular portion, said first deflector being attached to said first arm by said first horizontal portion extending through said first tubular portion;

a second arm having a second horizontal portion and a second vertical portion that is rotatably attached to said mounting bracket adjacent said second end thereof, said second vertical portion extending through said second vertical unthreaded hole and being held in a second operator-selected position by a second horizontal thumb screw that is screwed into a second threaded portion of said second horizontal hole and that impinges on said second vertical portion; and a second deflector having a second tubular portion and a second guard portion attached to said second tubular portion, said second deflector being attached to said second arm by said second horizontal portion extending through said second tubular portion.

2. The point of operation guard of claim 1 wherein a first unthreaded portion of said first horizontal hole extends through said first vertical unthreaded hole and a first spring is compressed in said first untreaded portion to the extent that said first arm resists rotation and up and down movement and a second unthreaded portion of said second horizontal hole extends through said second vertical unthreaded hole and a second spring is compressed in said second unthreaded portion to the extent that said second arm resists rotation and up and down movement.

3. The point of operation guard of claim 1 wherein said mounting bracket is comprised of two parts, each of which parts accommodating a portion of said mortice and having a horizontal threaded hole therein, said parts being held together by a threaded rod that is screwed into said first and second horizontal holes.

\* \* \* \* \*